US011036219B2

(12) United States Patent
Li et al.

(10) Patent No.: US 11,036,219 B2
(45) Date of Patent: Jun. 15, 2021

(54) SELF-PROPELLED DEVICE

(71) Applicants: Kevin Li, New York, NY (US); Anthony Ko-Ping Chien, Foster City, CA (US); Goh Jian Kai, Singapore (SG); Jessica A. Williamson, Middle Village, NY (US)

(72) Inventors: Kevin Li, New York, NY (US); Anthony Ko-Ping Chien, Foster City, CA (US); Goh Jian Kai, Singapore (SG); Jessica A. Williamson, Middle Village, NY (US)

(73) Assignee: Ketchup On, Inc., New York, NY (US)

( * ) Notice: Subject to any disclaimer, the term of this patent is extended or adjusted under 35 U.S.C. 154(b) by 285 days.

(21) Appl. No.: 15/999,460

(22) PCT Filed: Feb. 13, 2017

(86) PCT No.: PCT/US2017/017599
§ 371 (c)(1),
(2) Date: Aug. 17, 2018

(87) PCT Pub. No.: WO2017/146924
PCT Pub. Date: Aug. 31, 2017

(65) Prior Publication Data
US 2019/0086915 A1    Mar. 21, 2019

Related U.S. Application Data

(60) Provisional application No. 62/297,967, filed on Feb. 22, 2016, provisional application No. 62/309,487, filed on Mar. 17, 2016.

(51) Int. Cl.
*G05D 1/00* (2006.01)
*A63H 33/00* (2006.01)
(Continued)

(52) U.S. Cl.
CPC ......... *G05D 1/0038* (2013.01); *A63H 33/005* (2013.01); *G02B 27/648* (2013.01);
(Continued)

(58) Field of Classification Search
CPC ............ G05D 1/0038; H04N 5/23203; H04N 5/23241; H04N 5/2252; H04N 5/2253; G02B 27/648; A63H 33/005
See application file for complete search history.

(56) References Cited

U.S. PATENT DOCUMENTS 6,233,050 B1 * 5/2001 Lopez Gomez ... G01B 11/2408
356/635
6,899,686 B2 5/2005 Hampton et al.
(Continued)

FOREIGN PATENT DOCUMENTS

CN     1701929     11/2005
CN   105264452      1/2016
(Continued)

OTHER PUBLICATIONS

Crawford, Jae, "A Smart Ball Aims to Entertain Your Pets", Jan. 10, 2017.

*Primary Examiner* — Ian Jen
(74) *Attorney, Agent, or Firm* — Scott P. Zimmerman, PLLC (57) ABSTRACT

A spherical, self-propelled device responds to remote controls from a user. The self-propelled device has an internal drive system and an internal vision system. The vision system remains in a constant orientation with respect to the spherical, self-propelled device. As the spherical, self-propelled device rolls along a surface, the internal vision system captures video data from an upward field of view.

16 Claims, 13 Drawing Sheets

(51) Int. Cl.
  *H04N 5/225* (2006.01)
  *H04N 5/232* (2006.01)
  *G02B 27/64* (2006.01)

(52) U.S. Cl.
  CPC ......... *H04N 5/2251* (2013.01); *H04N 5/2252* (2013.01); *H04N 5/2253* (2013.01); *H04N 5/23203* (2013.01); *H04N 5/23241* (2013.01)

(56) References Cited

U.S. PATENT DOCUMENTS

| | | | |
|---|---|---|---|
| 7,209,588 B2 | 4/2007 | Liang et al. | |
| 7,737,866 B2 * | 6/2010 | Wu | B62D 15/0285 340/932.2 |
| 8,514,236 B2 | 8/2013 | Kobla et al. | |
| 8,790,279 B2 | 7/2014 | Brunner | |
| 8,928,734 B2 | 1/2015 | Dai et al. | |
| 9,692,949 B2 | 6/2017 | Hollinger | |
| 9,737,049 B2 | 8/2017 | Trottier et al. | |
| 10,025,973 B2 | 7/2018 | Datta et al. | |
| 2012/0009845 A1 | 1/2012 | Schmelzer | |
| 2014/0051513 A1 | 2/2014 | Polo et al. | |
| 2014/0238762 A1 * | 8/2014 | Berberian | G05D 1/0022 180/167 |
| 2016/0119541 A1 | 4/2016 | Alvarado-Moya et al. | |
| 2016/0246299 A1 | 8/2016 | Berberian et al. | |
| 2016/0249038 A1 | 8/2016 | Mosleh et al. | |
| 2017/0000081 A1 | 1/2017 | Betts-Lacroix et al. | |
| 2017/0112418 A1 | 4/2017 | Comeau et al. | |
| 2017/0202185 A1 | 7/2017 | Trumbull et al. | |

FOREIGN PATENT DOCUMENTS

| | | |
|---|---|---|
| DE | 102012016600 | 2/2014 |
| GB | 2407725 | 3/2003 |
| JP | 2015033059 | 2/2015 |

* cited by examiner

SELF-PROPELLED DEVICE

35 U.S.C. § 365 RIGHT OF PRIORITY

This national stage patent application claims a right of priority under 35 U.S.C. § 365 to International Application No. PCT/US2017/017599 filed Feb. 13, 2017, which claims priority to U.S. Provisional Application No. 62/297,967 filed Feb. 22, 2016 and to U.S. Provisional Application No. 62/309,487 filed Mar. 17, 2016, with both applications incorporated herein by reference in their entireties.

BACKGROUND

People and pets benefit from automation. People and pets, for example, can be entertained by machines and robots. People and pets may also benefit from automated security services.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
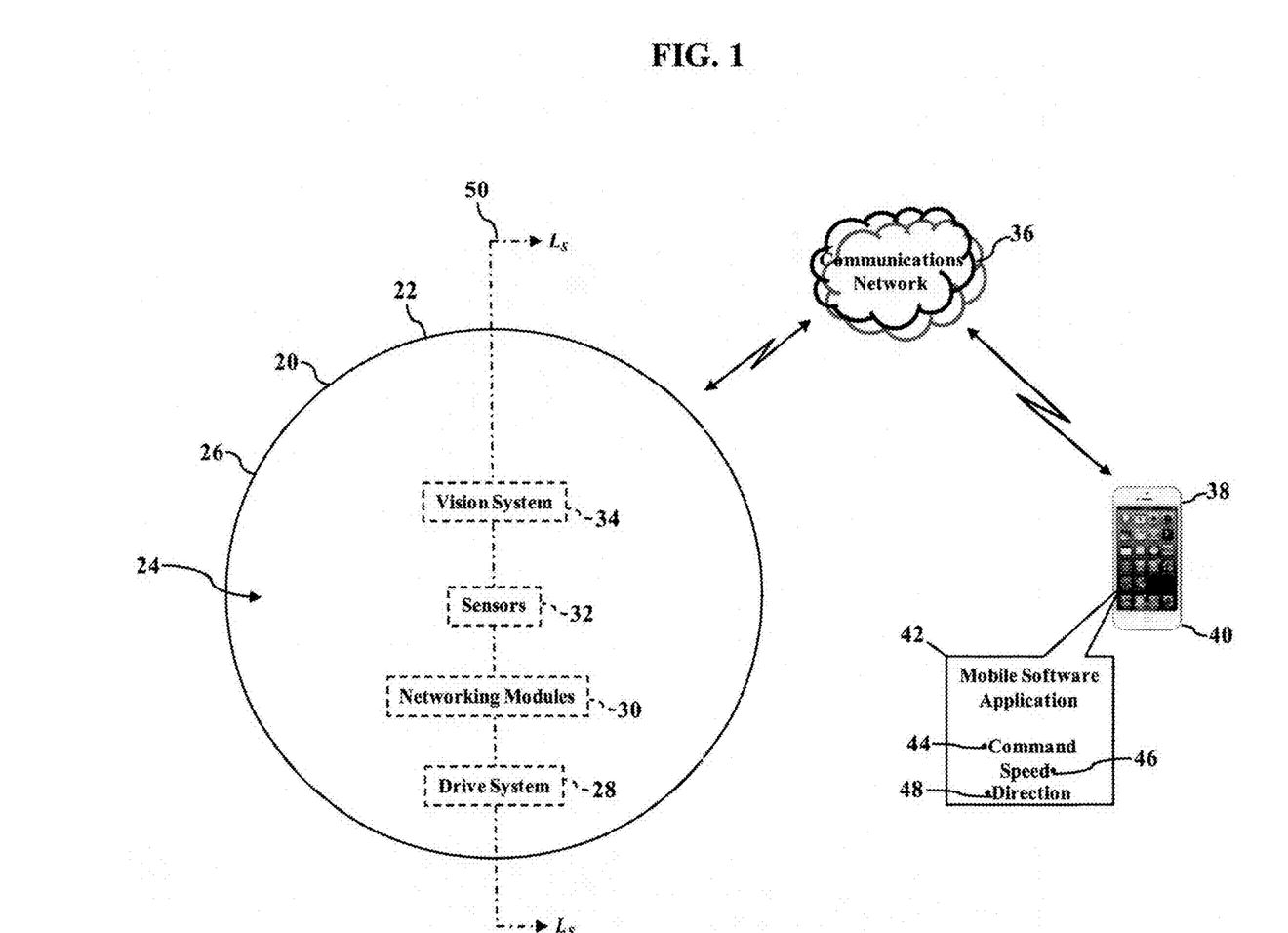
FIG. 1 is a simplified illustration of a self-propelled device, according to exemplary embodiments.

FIG. 1 is a simplified illustration of a self-propelled device 20, according to exemplary embodiments. The self-propelled device 20 has an outer or external housing 22 and internal componentry 24. FIG. 1 illustrates the housing 22 as a spherical ball 25 having an outer shell 26, but the housing 22 may have any exterior shape (as later paragraphs will explain). The internal componentry 24 includes a controller 27 (such as a hardware processor and a memory device), a drive system 28, networking modules 30, sensors 32, and a vision system 34. The internal componentry 24 interfaces with a communications network 36, thus allowing the internal componentry 24 to wirelessly send and/or receive signals. For example, the internal componentry 24 may establish communication with any electronic device 38, thus allowing the electronic device 38 to remotely control a rolling motion and/or direction of the self-propelled device 20. FIG. 1, for simplicity, illustrates the electronic device 38 as a mobile smartphone 40. The mobile smartphone 40 downloads, stores, and/or executes a mobile software application 42 that allows a user to enter one or more commands 44. The commands 44 may control a speed 46 and/or a direction 48 of the self-propelled device 20. The commands 44 are wirelessly sent to a network address associated with the self-propelled device 20, thus allowing the user to remotely control the rolling motion.

Figure 2:
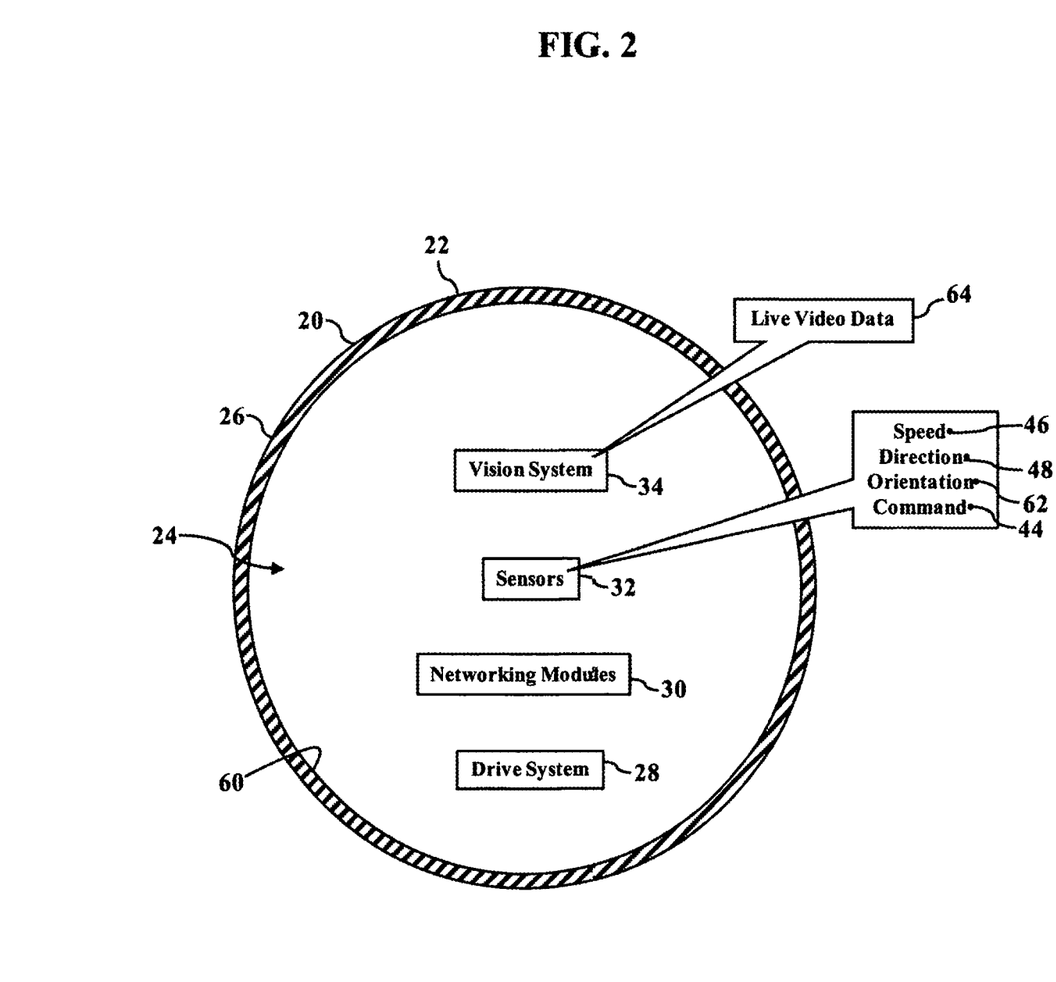
FIGS. 2-4 are sectional views of the self-propelled device, according to exemplary embodiments.
Figure 3:
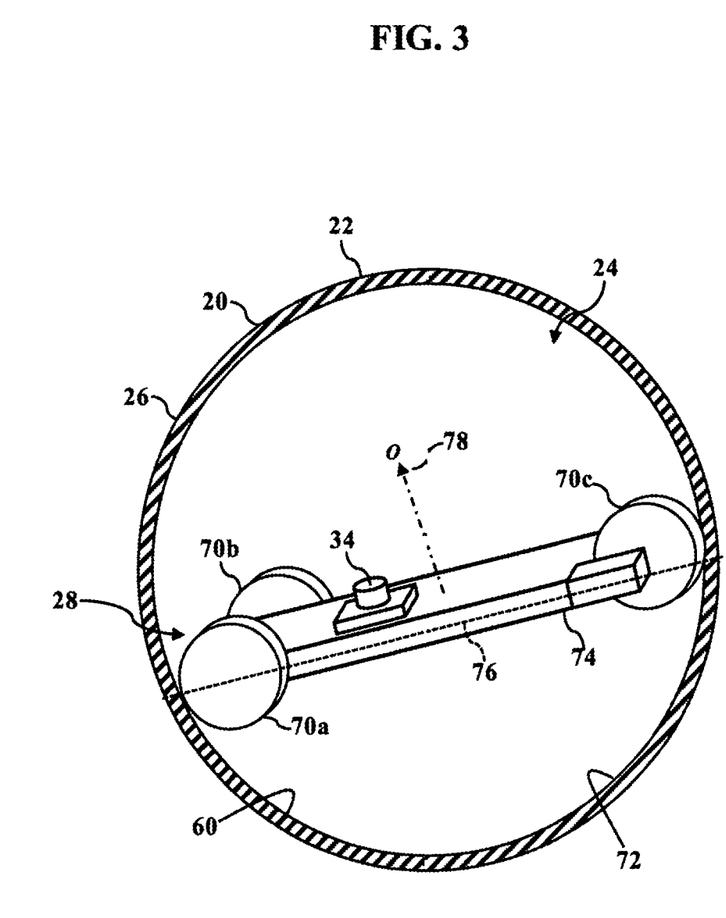
Figure 4:
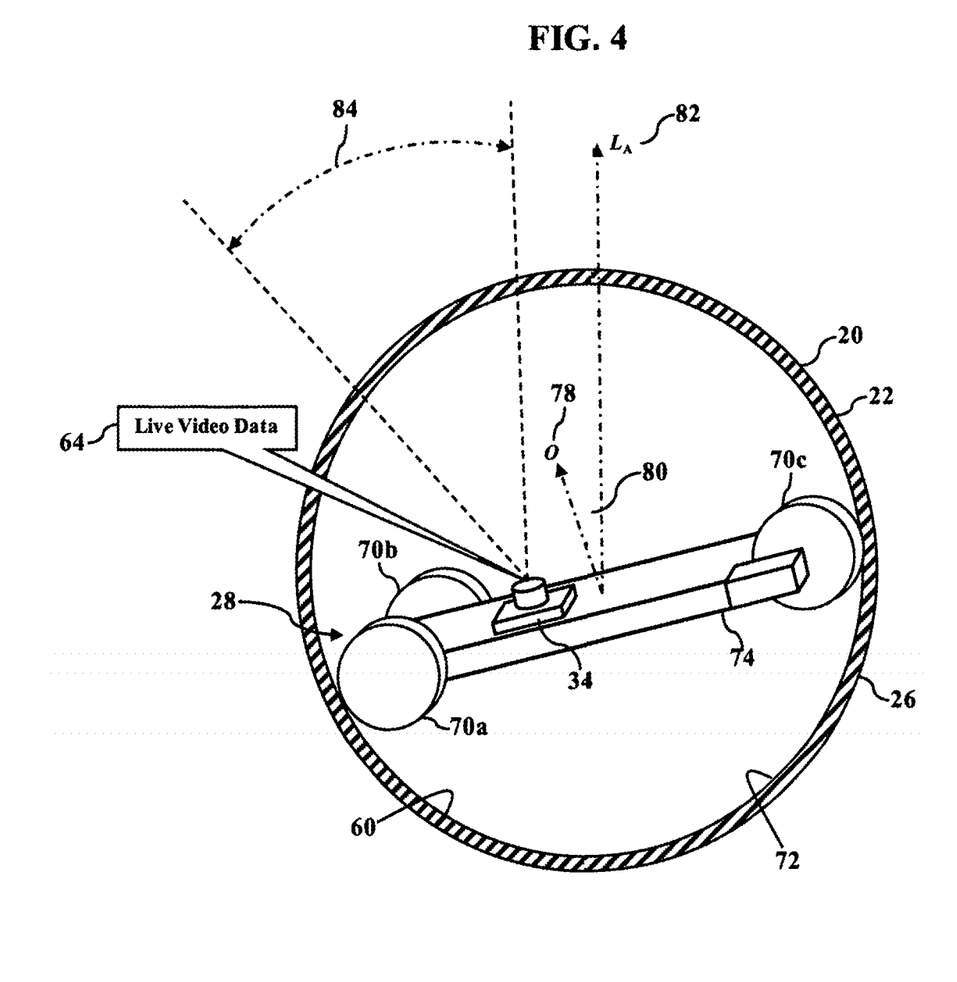

FIGS. 2-4 are sectional views of the self-propelled device 20, according to exemplary embodiments. The sectional view is taken along line $L_S$-$L_S$ (illustrated as reference numeral 50 in FIG. 1). FIG. 2, for simplicity, only illustrates the interior componentry 24 as block diagrams. The drive system 28 engages an interior side 60 of the housing 22, thus causing the spherical outer shell 26 to roll or to move. Outputs generated by the sensors 32 may be used to determine the speed 46, the direction 48, an orientation 62, and other parameters (e.g., yaw, pitch, and/or roll). So, as the self-propelled device 20 rolls along, the vision system 34 captures live video data 64 for upload to any destination (such as the mobile smartphone 40 illustrated in FIG. 1 and/or a cloud-based server). Regardless, the remote user may watch the live video data 64 and issue the command(s) 44 to change the rolling speed 46 and/or direction 48, thus maneuvering the self-propelled device 20.

FIG. 3 illustrates some details of the drive system 28. Here the drive system 28 may have one or more drive wheels 70 that frictionally engage the interior side 60 of the housing 22. FIG. 3 illustrates two (2) drive wheels 70a and 70b that may be separately driven by respective electric motors (not shown for simplicity). The drive system 28 may also have a third wheel 70c that also engages the interior side 60 of the housing 22. The third wheel 70c may be driven by its own motor (again not shown for simplicity), or the third wheel 70c may be an unpowered roller/follower. Regardless, all the wheels 70a, 70b, and 70c may follow a contour 72 of the interior side 60 of the housing 22. The wheels 70a, 70b, and 70c are spaced along a rigid support structure 74 to fit and ride within an interior volume of the housing 22. For example, the wheels 70a, 70b, and 70c and the rigid support structure 74 may have an overall length 76 that is less than or equal to an interior diameter of the spherical housing 22. As the motors drive their respective wheels 70a, 70b, and/or 70c, the rigid support structure 74 may keep all three wheels 70a, 70b, and 70c in constant, rigid physical contact with the interior side 60 of the housing 22. As the self-propelled device 20 rolls along a floor (due to at least the driven wheels 70a and 70b), the rigid support structure 74 maintains its internal orientation O (illustrated as reference numeral 78).

FIG. 4 illustrates orientational details of the vision system 34. The vision system 34 may be mounted or affixed to the rigid support structure 74. Because the wheels 70a, 70b, and 70c may remain in constant physical contact with the interior side 60 of the housing 22, the rigid support structure 74 constantly remains in its internal orientation O (illustrated as reference numeral 78). That is, the rigid support structure 74 has a nearly constant orientation (illustrated simply as an angle $\phi$ (illustrated as reference numeral 80) with respect to a vertical axis $L_A$ (illustrated as reference numeral 82). In actual practice, though, the rigid support structure 74 has a nearly constant orientation in three (3) dimensions (such as R, $\theta$, $\phi$ in spherical coordinates). So, as the self-propelled device 20 rolls, the vision system 34 also stays in the same relatively fixed position relative to the rigid support structure 74, to the vertical axis $L_A$ (illustrated as reference numeral 82), and to the outer housing 22. The vision system 34 may thus nearly always have an upward field 84 of view. The vision system 34 may thus nearly always have a top ward orientation that provides upper, vertical, or skyward views as the self-propelled device 20 rolls, regardless of direction. If the external housing 22 is constructed or molded of a clear, transparent, and/or translucent material, the vision system 34 (such as a digital camera) captures a clear skyward view as the self-propelled device 20 rolls.

Exemplary embodiments are great for people and pets. Suppose the self-propelled device 20 is used as a remote-controlled toy. A dog owner, for example, may remotely send the directional commands 44 (perhaps via the smartphone 40 illustrated in FIG. 1) and have the pet dog chase the self-propelled device 20. All the while, though, the vision system 34 captures the live video data 64, thus allowing the dog owner to see the happy pet dog chasing the self-propelled device 20.

Exemplary embodiments may also be used for security. The self-propelled device 20 may be commanded to roll and roam the halls and rooms of any home or building. As the self-propelled device 20 moves, the vision system 34 may be commanded to capture the live video data 64 as surveillance. The self-propelled device 20 may thus maneuver into any area and quickly scan different directions for intruders or other security concerns. Indeed, should an intruder be discovered, the self-propelled device 20 may initiate pursuit and capture the live video data 64 for visual identification and location.

Figure 5:
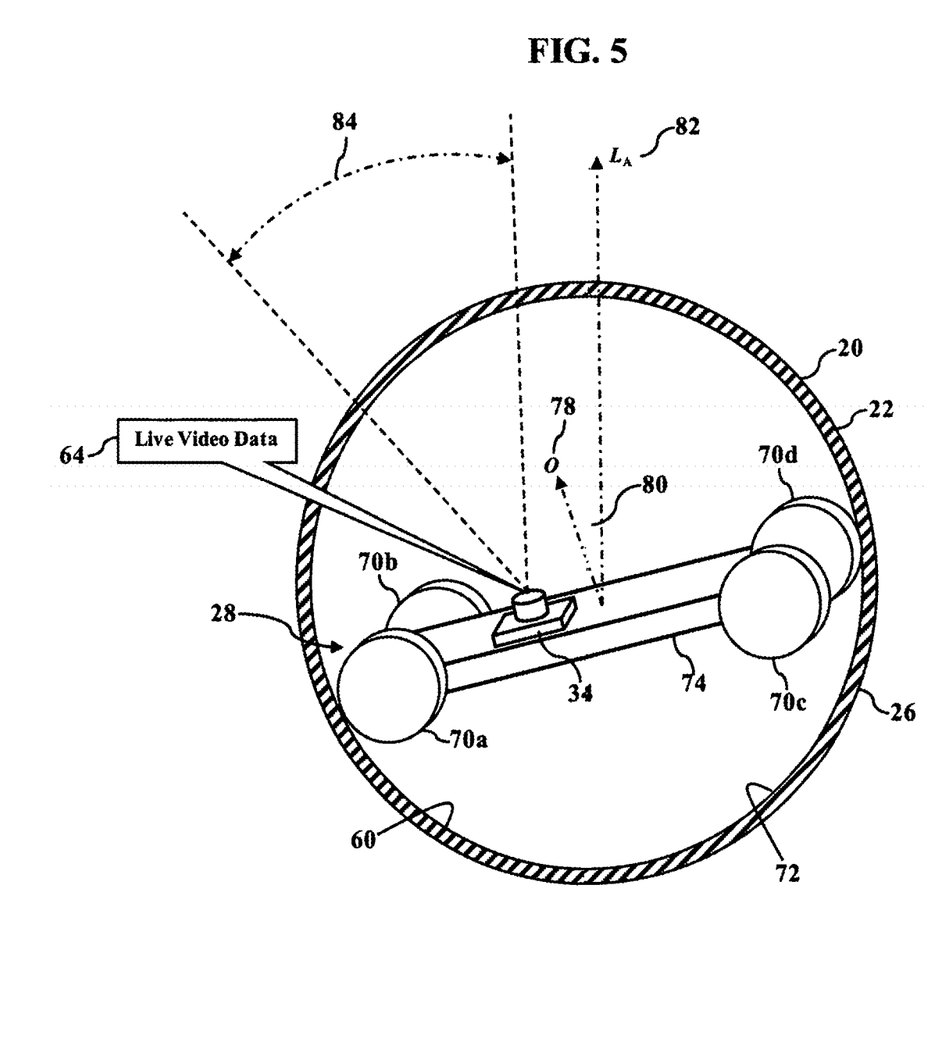
FIG. 5 is another sectional view of the self-propelled device, according to exemplary embodiments.

FIG. 5 is another sectional view of the self-propelled device 20, according to exemplary embodiments. The sectional view is again taken along line $L_S$-$L_S$ (illustrated as reference numeral 50 in FIG. 1). FIG. 5 also illustrates more details of the drive system 28. Here the drive system 28 may have four (4) wheels 70a-70d. Some or all of the wheels 70a-70d may be separately driven, or one or more of the wheels may be rollers/followers. Regardless, the wheels 70a-70d are spaced along the rigid support structure 74 to have a wheelbase or the overall length (illustrated as reference numeral 76 in FIG. 3) generally equal to the interior diameter of the the housing 22. The wheels 70a-70d may thus follow the contour 72 of the interior side 60 of the housing 22, perhaps always in contact. As the self-propelled device 20 rolls, the rigid support structure 74 maintains its internal orientation O (illustrated as reference numeral 78). The vision system 34 also stays in the same relatively fixed position relative to the rigid support structure 74, to the vertical axis $L_A$ (illustrated as reference numeral 82), and to the outer housing 22. The vision system 34 may thus nearly always have the upward field 84 of view as the live video data 64 is captured and stored.

Figure 6:
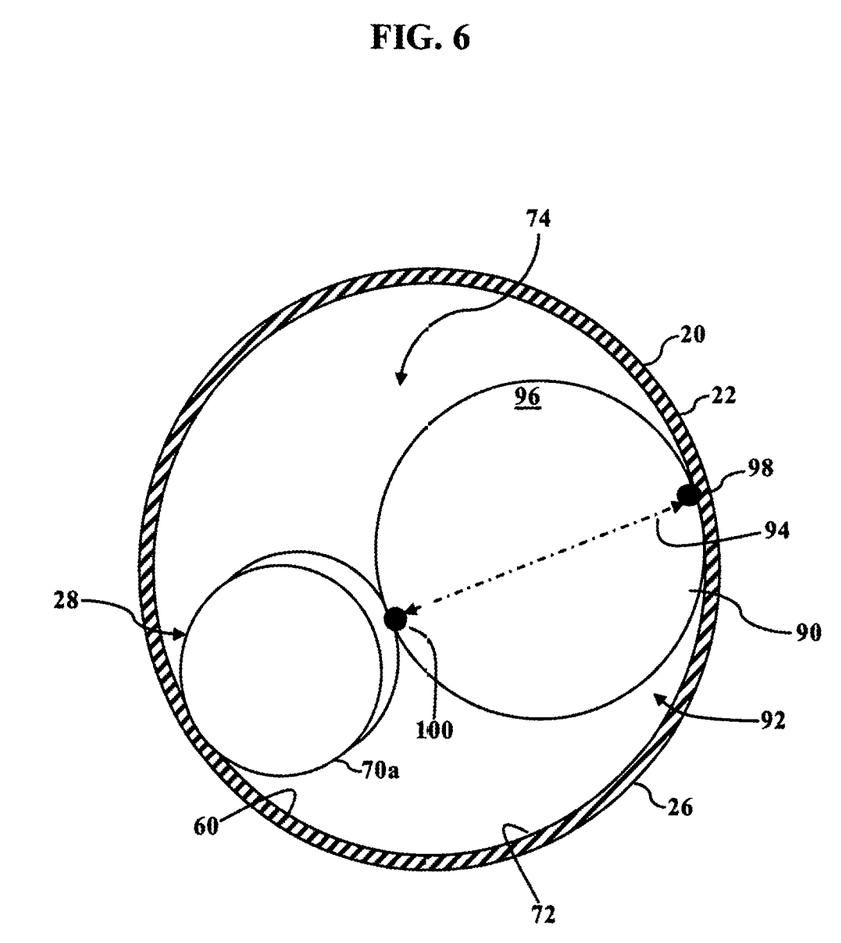
FIGS. 6-8 are more sectional views of the self-propelled device, according to exemplary embodiments.
Figure 7:
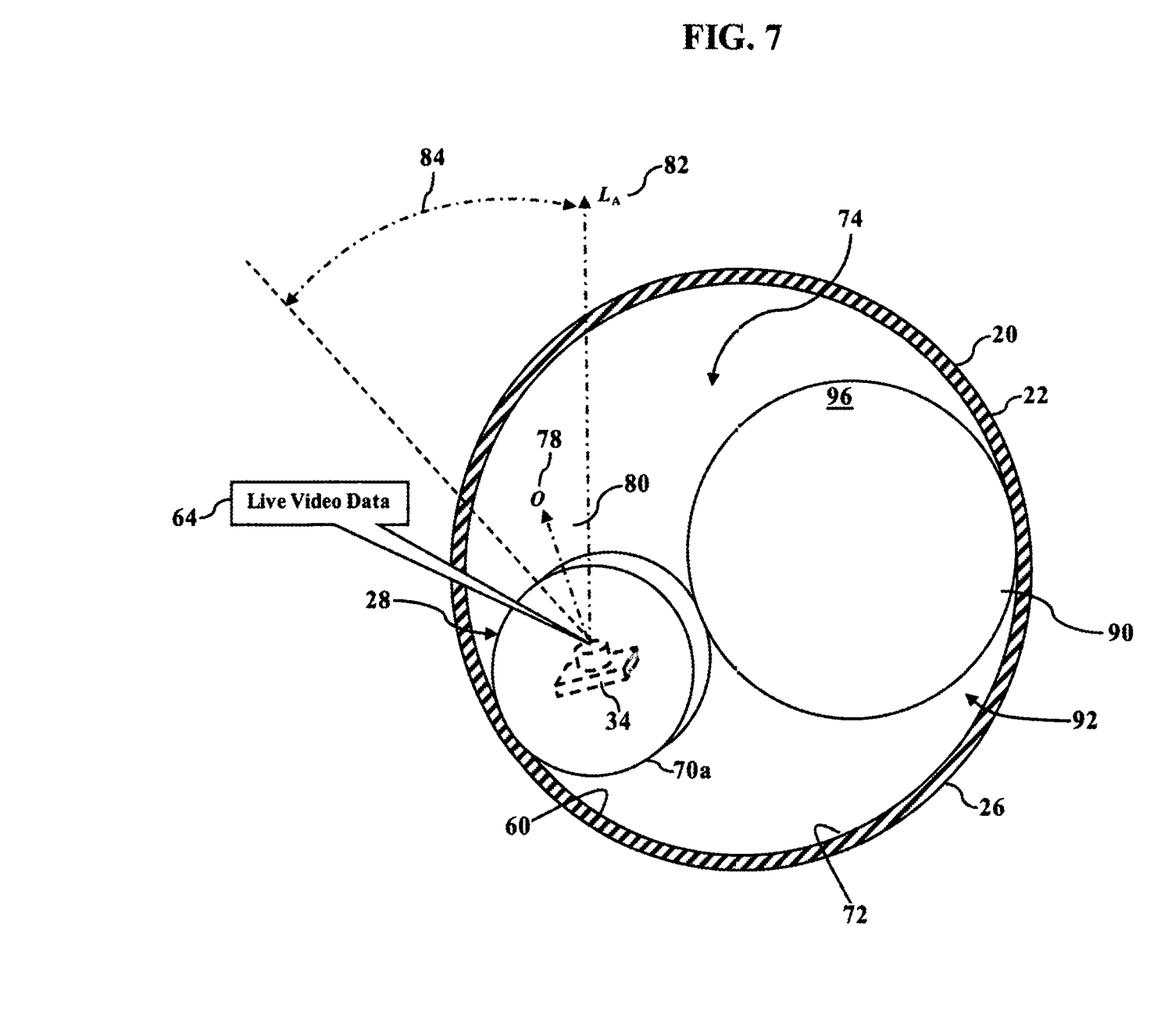
Figure 8:
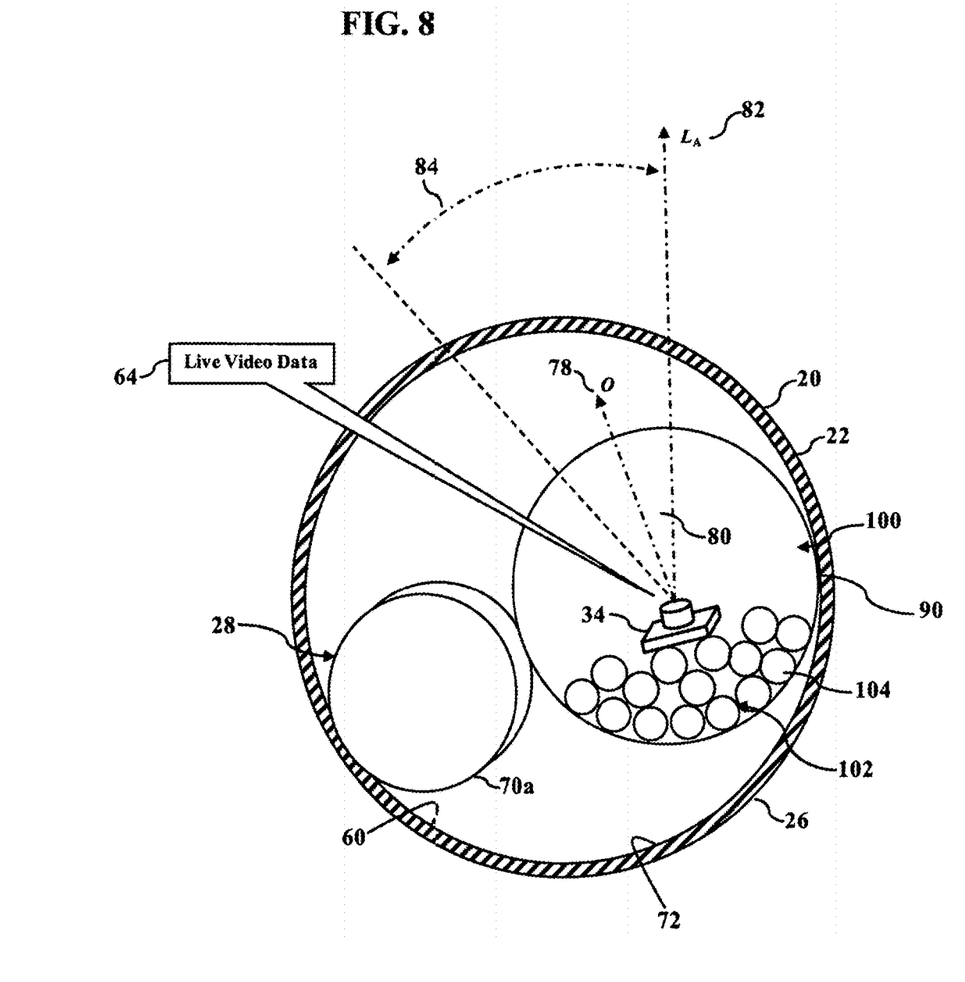

FIGS. 6-8 are more sectional views of the self-propelled device 20, according to exemplary embodiments. The sectional view is again taken along line $L_S$-$L_S$ (illustrated as reference numeral 50 in FIG. 1). The drive system 28 engages the interior side 60 of the housing 22, thus causing the spherical outer shell 26 to roll or to move. Here, though, the drive system 28 may also engage an internal orb 90 that houses the vision system 34. The orb 90 may have its own rigid exterior shell 92. For simplicity, FIG. 6 illustrates the internal orb 90 having a generally spherical outer or cross-sectional shape, but the orb 90 may have any other generally egg, oval, or ovoid shape. Regardless, the orb 90 has an external diameter 94 (e.g., major or minor) sized to maintain the drive wheels (such as 70a) in constant contact with the interior side 60 of the housing 22. That is, the rigid exterior shell 92 of the orb 90 has an outer surface 96 having a first rolling contact point 98 with the interior side 60 of the housing 22. The rigid exterior shell 92 has a second rolling contact point 100 with the drive system 28. The internal orb 90 and the drive wheel 70a may thus have a wheelbase or the overall length (illustrated as reference numeral 76 in FIG. 3) that is generally equal to the interior diameter of the housing 22. The drive wheel(s) 70a may thus follow the contour 72 of the interior side 60 of the housing 22, perhaps always in contact. As the self-propelled device 20 rolls, the internal orb 90 may roll in concert or in synchronous motion. The internal orb 90 and the drive system 28 thus act as a rolling, but rigid support structure 74 to keep the drive wheels (such as 70a and/or 70b illustrated in FIGS. 3-5) in contact with the interior side 60 of the housing 22.

FIG. 7 illustrates the vision system 34. Here again the vision system 34 may remain fixed. The vision system 34 may mount to, and/or ride on, any portion of the rigid support structure 74. FIG. 7, for example, illustrates the vision system 34 mounted to any structure supporting the drive wheel(s) 70. As the drive wheel(s) 70 and the internal orb 90 cooperatively roll and follow the contour 72 of the interior side 60 of the housing 22, the vision system 34 may stay in the same relatively fixed position. That is, the vision system 34 may have the nearly constant angle φ (illustrated as reference numeral 80) with respect to the vertical axis $L_A$ (illustrated as reference numeral 82) and to the outer housing 22. The vision system 34 may thus nearly always have the upward field 84 of view as the live video data 64 is captured and stored.

FIG. 8 also illustrates the vision system 34. Here, though, the vision system 34 may alternatively or additionally ride within an internal chamber 100 of the orb 90, thus maintaining a relatively fixed position with respect to the outer housing 22. FIG. 8, for example, illustrates a bed 102 of ball bearings 104. The vision system 34 may set or lie atop the bed 102 of the ball bearings 104. The size and number of the ball bearings 104 may be chosen to suit any design or physical criterion. Again, as the self-propelled device 20 rolls, the internal orb 90 rolls against the interior side 60 of the housing 22, perhaps always in contact. Yet the ball bearings 104 allow the vision system 34 to remain in its fixed orientation. That is, as the self-propelled device 20 rolls, gravity will cause the bed 102 of the ball bearings 104 to shift, roll, and/or rearrange. The bed 102 of the ball bearings 104 may thus approximately keep the vision system 34 at the nearly constant angle φ (illustrated as reference numeral 80) with respect to the vertical axis $L_A$ (illustrated as reference numeral 82) and to the outer housing 22. The vision system 34 may thus nearly always have the upward field 84 of view as the live video data 64 is captured and stored. The vision system 34 thus captures the upper, vertical, or skyward views as the self-propelled device 20 rolls, regardless of direction.

Figure 9:
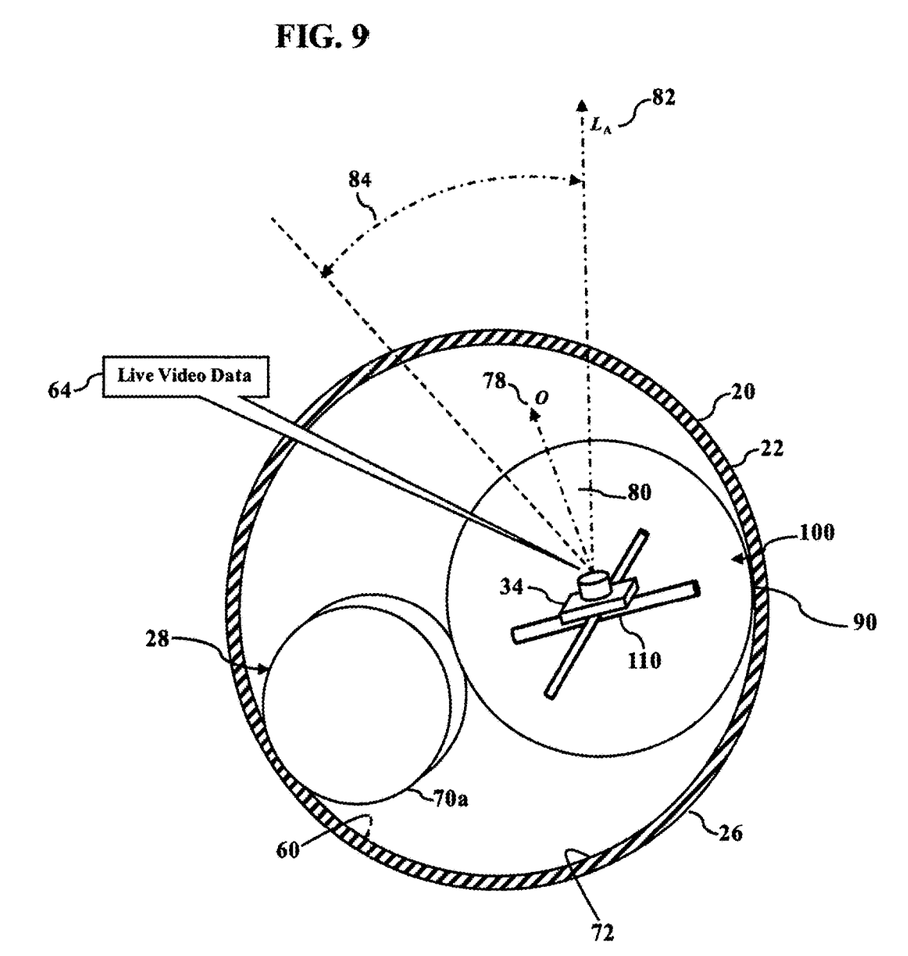
FIGS. 9-10 are more sectional views of the self-propelled device, according to exemplary embodiments.
Figure 10:
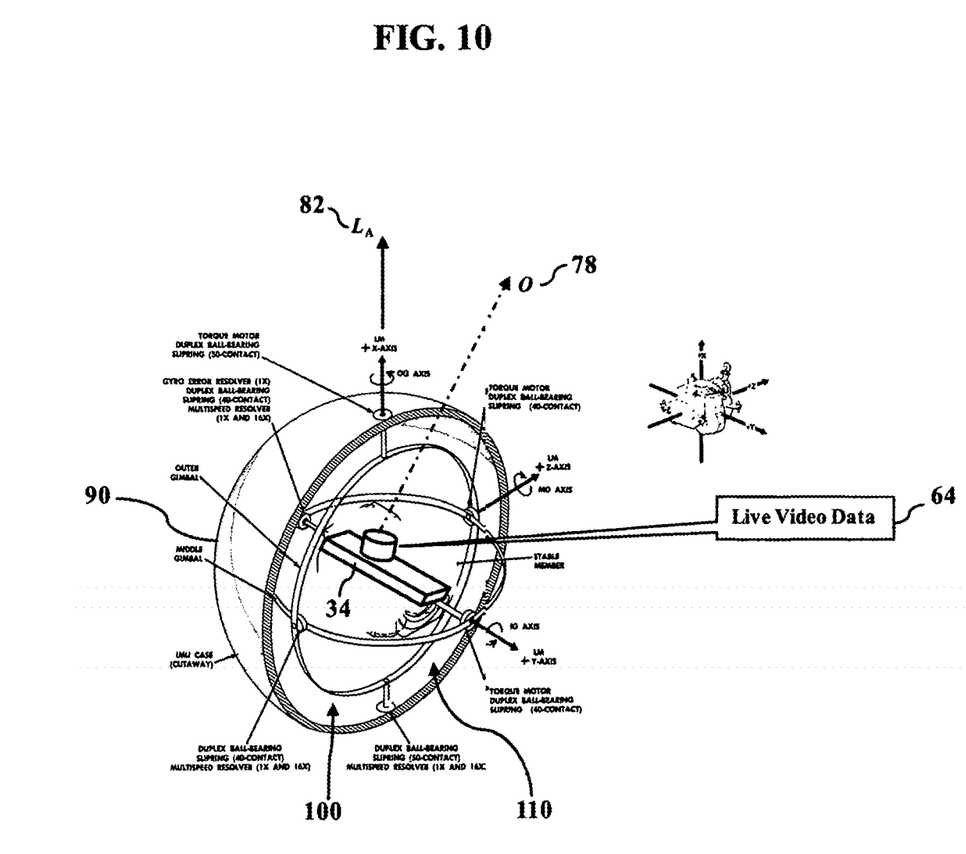

FIGS. 9-10 are still more sectional views of the self-propelled device 20, according to exemplary embodiments. The sectional view is again taken along line $L_S$-$L_S$ (illustrated as reference numeral 50 in FIG. 1). The drive system 28 engages the interior side 60 of the housing 22, thus causing the spherical outer shell 26 to roll or to move. The drive system 28 may also engage the internal orb 90 that houses the vision system 34. Here, though, the internal orb 90 may house rotating internal gimbals 110. Each internal gimbal 110 rotates about a different axis. Again, as the self-propelled device 20 rolls, the internal orb 90 may roll against the interior side 60 of the housing 22, perhaps always in contact. Yet the internal gimbals 110 allow the vision system 34 to remain in its fixed orientation. That is, the vision system 34 has the nearly constant orientation (illustrated as the angle φ 80) with respect to the vertical axis $L_A$ (illustrated as reference numeral 82) and to the outer housing 22. The vision system 34 may thus nearly always have the upward field 84 of view as the live video data 64 is captured and stored. The vision system 34 thus captures the upper, vertical, or skyward views as the self-propelled device 20 rolls, regardless of direction.

FIG. 10 illustrates more details of the rotating internal gimbals 110. An outer gimbal 112 has a pair of slipring supports 114 that pivot about an x-axis 116. A smaller middle gimbal 118 has a different pair of slipring supports 120 that pivot about a z-axis 122. A stable inner gimbal 124 pivots about a y-axis 126. The gimbals 110 may have ball bearings to reduce friction and to allow orthogonal, rotational movement about their respective axes. Regardless, the vision system 34 may be mounted to the inner gimbal, thus allowing the vision system 34 to remain independent of the rotation of the self-propelled device (illustrated as reference numeral 20 in FIGS. 1-9). As the internal orb 90 rolls against the interior side 60 of the housing 22 (perhaps always in contact, as illustrated with reference to FIGS. 6-9), the vision system 34 remains in the nearly constant orientation with respect to the vertical axis $L_A$ (illustrated as reference numeral 82) and to the outer housing 22. The vision system 34 may thus nearly always have the upward field 84 of view as the live video data 64 is captured and stored. The vision system 34 thus captures the upper, vertical, or skyward views as the self-propelled device 20 rolls, regardless of direction.

Exemplary embodiments may thus constantly align in relation to gravity. As the reader may understand, the rotating internal gimbals 110 allow the vision system 34 to remain generally aligned with the force of gravity. Indeed, exemplary embodiments provide a nearly constant alignment in relation to gravity. So, no matter the rotational speed or rotational direction, exemplary embodiments maintain the alignment of the vision system 34. The vision system 34 (e.g., the digital camera) has the relatively constant upward field 84 of view to capture the live video data 64. If the external housing 22 is constructed or molded of a clear, transparent, and/or translucent material, exemplary embodiments provide a clear skyward view as the self-propelled device 20 rolls.

Figure 11:
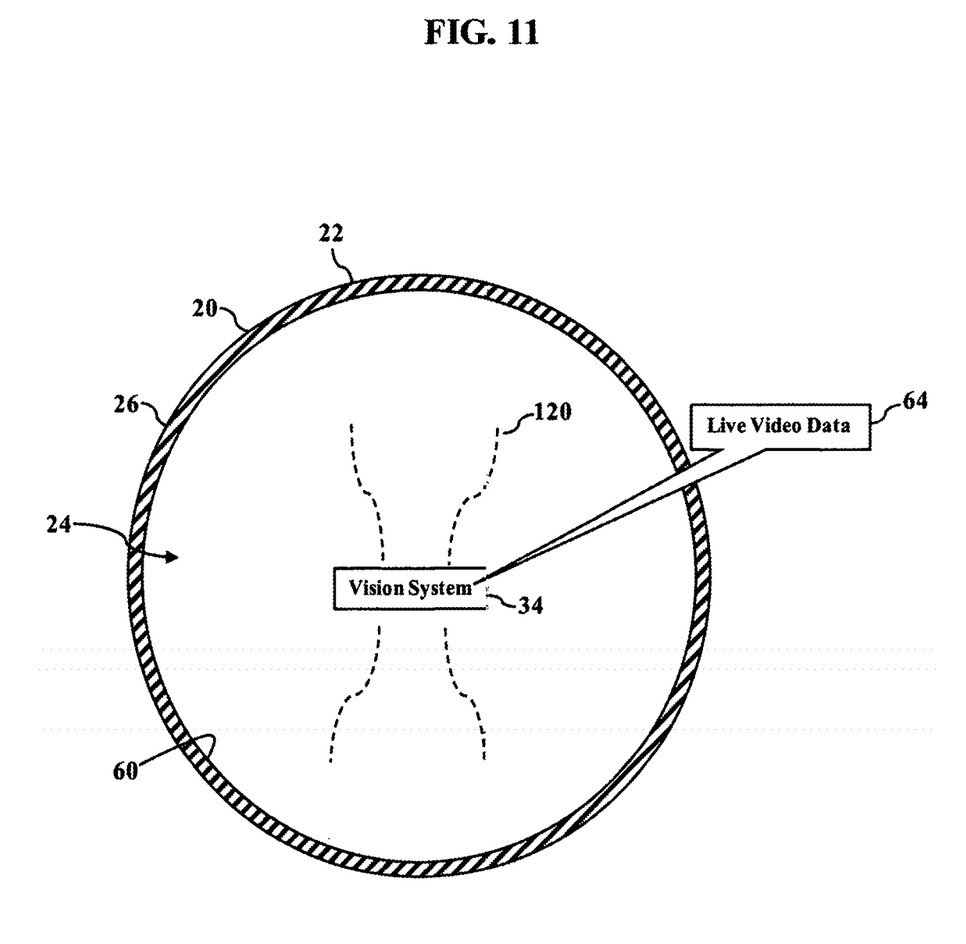
FIG. 11 is another sectional view of the self-propelled device, according to exemplary embodiments.

FIG. 11 is another sectional view of the self-propelled device 20, according to exemplary embodiments. The sectional view is again taken along line $L_S$-$L_S$ (illustrated as reference numeral 50 in FIG. 1). Here, though, the vision system 34 is electromagnetically suspended (illustrated as reference numeral 130) within the interior of the the housing 22. Electrical power (such as that supplied by an internal battery, solar cells, and/or induction) may be used to produce magnetic fields. This allows for contact-less suspension, and may require a magnetic substrate.

Figure 12:
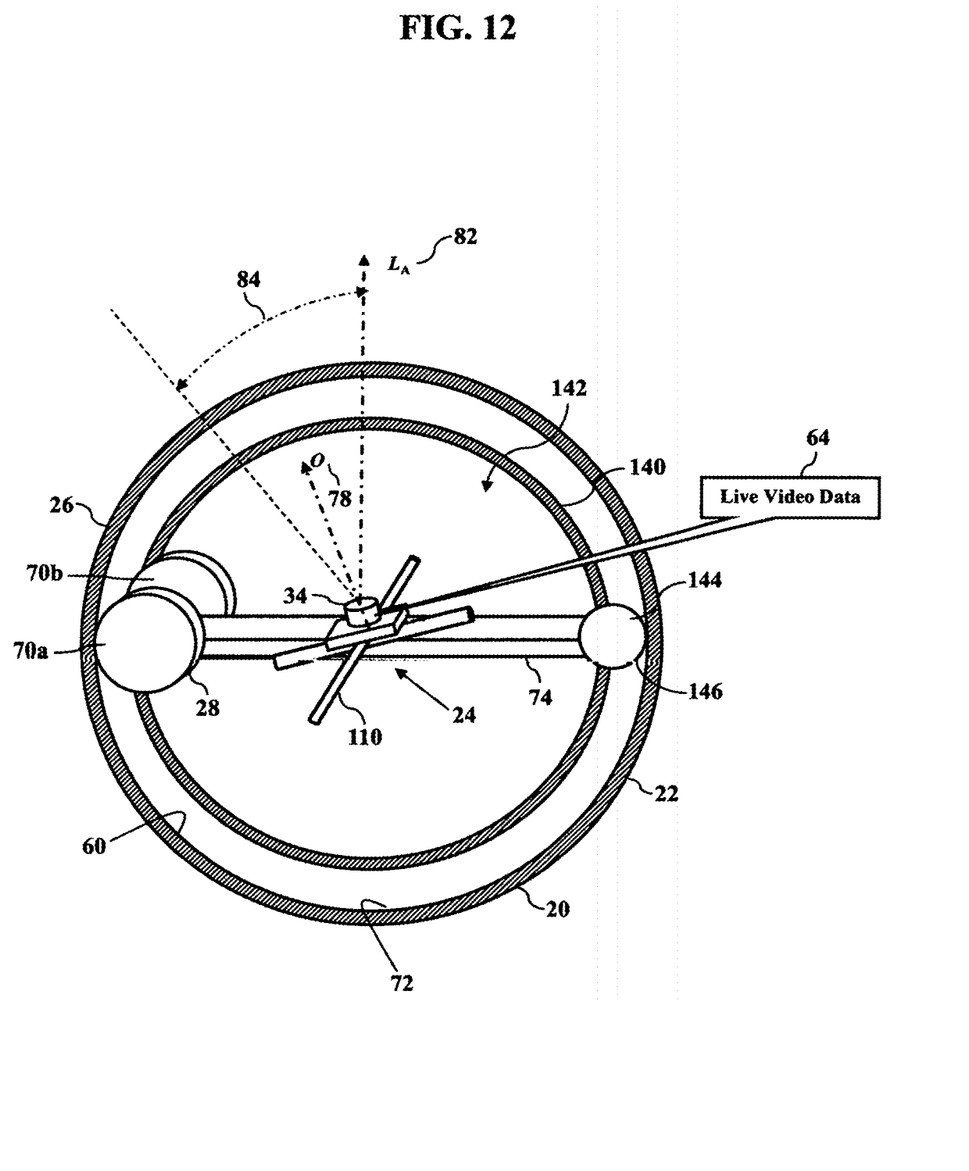
FIGS. 12-13 are more sectional views of the self-propelled device, according to exemplary embodiments.
Figure 13:
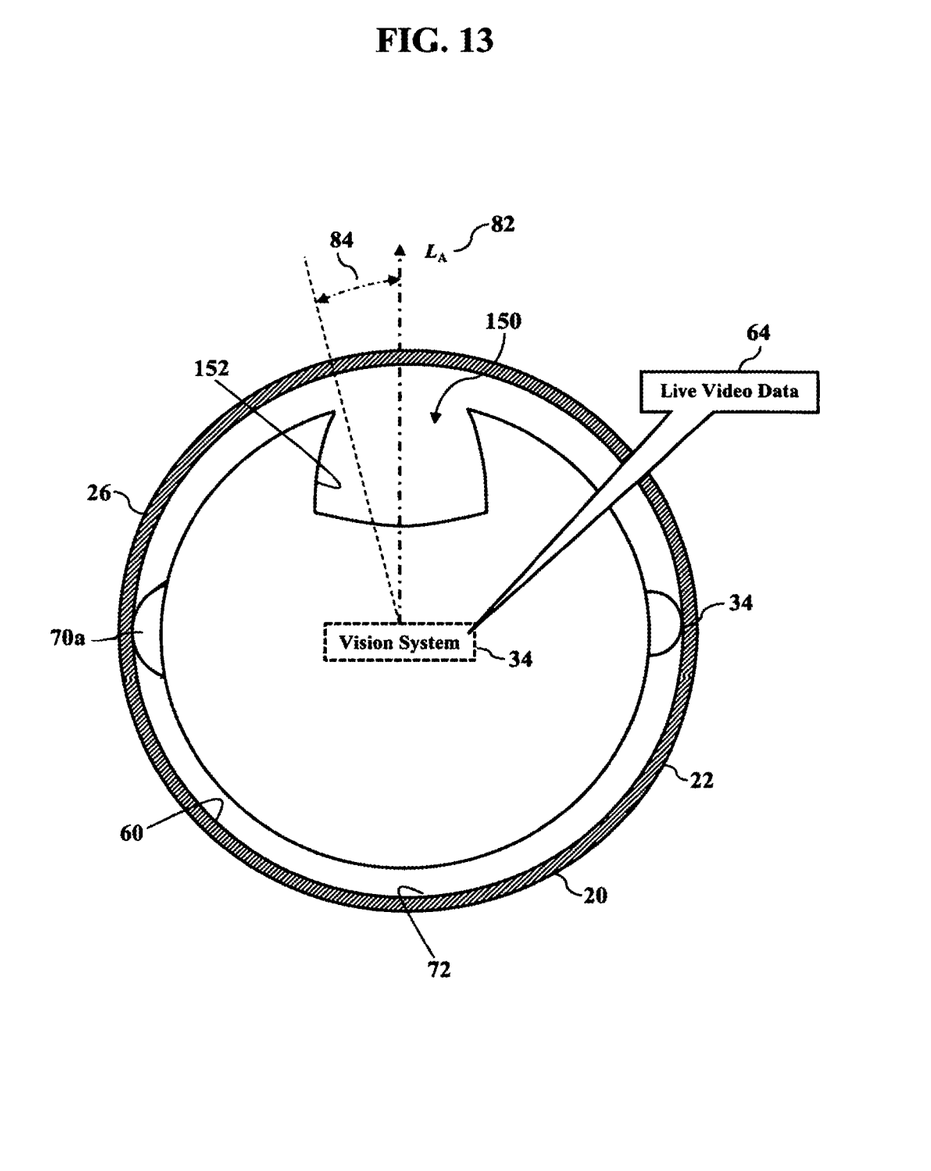

FIGS. 12-13 are more sectional views of the self-propelled device 20, according to exemplary embodiments. The sectional view is again taken along line $L_S$-$L_S$ (illustrated as reference numeral 50 in FIG. 1). Here, though, the self-propelled device 20 may have concentric inner and outer spheres. That is, the outer housing 22 is again illustrated as the spherical outer shell 26. An inner sphere 140, though, may be suspended within the spherical outer shell 26. The inner sphere 140 itself may have at least a partially hollow interior 142 that may house the internal componentry 24. The drive system 28, for example, may have the two (2) wheels 70a and 70b that are spaced along the rigid support structure 74. The drive system 28 may also have a third supporting member 144. FIG. 12 illustrates a roller bearing 146, but the third supporting member 144 may be another wheel or other rolling member. Regardless, the wheels 70a-70b and the roller bearing 146 are spaced along the rigid support structure 74 to have the wheelbase or overall length (illustrated as reference numeral 76 in FIG. 3) generally equal to the interior diameter of the spherical outer shell 26. As the self-propelled device 20 rolls along a floor or other surface, the wheels 70a-70b and the roller bearing 146 may thus follow the contour 72 of the interior side 60 of the housing 22, perhaps always in contact.

The vision system 34 captures the live video data 64. As the self-propelled device 20 rolls, the internal gimbals 110 allow the vision system 34 to remain in its fixed orientation. The internal gimbals 110 may thus be incorporated into the rigid support structure 74, thus allowing the vision system 34 to have the nearly constant orientation (illustrated as the angle φ 80) with respect to the vertical axis $L_A$ (illustrated as reference numeral 82), to the inner sphere 140, and to the outer housing 22. Indeed, as FIG. 13 illustrates, the inner sphere 140 may have an aperture or window 150 through which the vision system 34 peers to capture the live video data 64. The window 150 has an edge 152 or wall that extends through a material thickness of the inner sphere 140. So, no matter what the material or transparency of the inner sphere 140, the vision system 34 may thus nearly always have the upward field 84 of view as the inner sphere 140 spins or rotates with respect to the spherical outer shell 26. Again, if the spherical outer shell 26 is molded or constructed of a clear or transparent material (e.g., polycarbonate or even glass), the vision system 34 thus captures the upper, vertical, or skyward views as the self-propelled device 20 rolls, regardless of direction.

Exemplary embodiments are thus remotely controllable. The self-propelled device 20 may maintain a frame of reference about an X-, Y- and Z-axis. Received inputs are used to control the self-propelled device 20, with the inputs perhaps being based on the X-, Y- and/or Z-axis. The self-propelled device 20 is controlled in its movement, including about each of the X-, Y- and Z-axes, based on the input. The self-propelled device 20 may thus have a controller (e.g., a hardware microprocessor and a memory device) that responds to two or three dimensional inputs for remote control. The self-propelled device 20 may thus determine its own orientation (perhaps using global positioning system coordinates and/or information from a GPS receiver) for its movement based on a pre-determined reference frame. Exemplary embodiments may even include a user interface for controlling at least a directional movement of the self-propelled device 20, receive information from the self-propelled device 20 over the communications network indicating an orientation, and configure the user interface to reflect the orientation. Exemplary embodiments may even execute instructions that electronically map individual inputs from a first set of recognizable inputs to a corresponding command that controls movement.

Exemplary embodiments may packetize. The various network interfaces to the communications network 34 may packetize communications or messages into packets of data according to a packet protocol, such as the Internet Protocol. The packets of data contain bits or bytes of data describing the contents, or payload, of a message. A header of each packet of data may contain routing information identifying an origination address and/or a destination address. There are many different known packet protocols, and the Internet Protocol is widely used, so no detailed explanation is needed.

Exemplary embodiments may be applied regardless of networking environment. Exemplary embodiments may be easily adapted to stationary or mobile devices having cellular, WI-FI®, near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations", this could include the processor performing the operations directly and/or facilitating, directing, or cooperating with another device or component to perform the operations.

Exemplary embodiments may utilize any sensory technology. Sensors provide information about the surrounding environment and condition. The sensor(s) may include inertial measurement devices, including a 3-axis gyroscope, a 3-axis accelerometer, and a 3-axis magnetometer. According to some embodiments, the sensors provide input to enable processor to maintain awareness of orientation and/or position relative to the initial reference frame after the device initiates movement. In various embodiments, sensors include instruments for detecting light, temperature, humidity, or measuring chemical concentrations or radioactivity.

Exemplary embodiments may include an internal and/or external power source. The power source may be rechargeable battery. An inductive charge port may allow for recharging without a wired electrical connection. The inductive charge port accepts magnetic energy and converts it to electrical energy to recharge the batteries. The inductive charge port may provide a wireless communication interface with an external charging device. Exemplary embodiments may include a very low power or "deep sleep" mode where most of the electronic devices use no battery power. This is useful for long-term storage or shipping. The motors use the electrical power for movement and steering according to friction/traction. The drive system causes rotation and translation, under control of processor. The drive wheels may be parallel or not parallel, but mounted to axles connected to an independently variable-speed motor through a reduction gear system. In such an embodiment, the speeds of the drive motors are controlled by processor.

Exemplary embodiments may have any shape. This disclosure primarily discusses a spherical ball, which is thought most simple to understand. However, exemplary embodiments may have other outer shapes, such as multi-faceted soccer or Bucky ball (e.g., hexagons and/or pentagons) for rolling motion. However, exemplary embodiments may also be adapted to any shape capable of rolling and/or spinning. Moreover, exemplary embodiments may also be adapted to radio-controlled aircraft, such as an airplane, helicopter, hovercraft or balloon. Exemplary embodiments may also be adapted to radio controlled watercraft, such as a boat or submarine. Numerous other variations may also be implemented, such as a robot.

Exemplary embodiments may utilize the Internet. As exemplary embodiments establish communication with the communication network, the user may be remotely located far away (such as miles). The user may thus issue speed and directional commands over the Internet for remote control. Exemplary embodiments may thus interface with a server, web site, or another computing device at a remote location. A networked user may thus remotely control over the Internet. More local control, of course, may be establish using WI-FI, BLUETOOTH, and/or any other IEEE 802 links.

Exemplary embodiments may be physically embodied on or in a processor-readable device or storage medium. For example, exemplary embodiments may include CD-ROM, DVD, tape, cassette, floppy disk, optical disk, memory card, memory drive, and large-capacity disks.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A system, comprising:
    a hardware processor; and
    a memory device storing instructions that, when executed by the hardware processor, perform operations, the operations comprising:
    receiving a command;
    in response to the command, controlling a drive system having a overall length (a wheelbase and wheels) equal to an inner diameter of an inner surface of an outer spherical housing; and
    generating video data associated with a vision system housed within the outer spherical housing;
    wherein the vision system generates the video data as the drive system rigidly contacts the inner surface to roll the outer spherical housing.

2. The system of claim 1, wherein the drive system comprises at least three wheels contacting the inner surface of the outer spherical housing.

3. The system of claim 1, wherein the drive system comprises at least three wheels constantly contacting the inner surface of the outer spherical housing.

4. The system of claim 1, wherein the drive system comprises at least three wheels physically contacting the inner surface of the outer spherical housing.

5. The system of claim 1, wherein the drive system comprises a rigid support structure with at least three wheels having the wheelbase equal to the inner diameter of the inner surface of the outer spherical housing that keeps the at least three wheels physically contacting the inner surface of the outer spherical housing.

6. The system of claim 1, further comprising a network interface to a communications network.

7. The system of claim 1, further comprising a global positioning system receiver that receives a global positioning system information representing a geographical location.

8. A method, comprising:
    receiving, by a self-propelled device, a command sent via a communications network from a device;
    controlling, by the self-propelled device, a drive system in response to the command, the drive system housed within an outer spherical housing, the drive system having a overall length (including at least two wheels having a wheelbase) equal to an inner diameter of the outer spherical housing, the at least two wheels rigidly contacting an inner surface of the outer spherical housing; and
    generating, by the self-propelled device, a video data associated with a vision system housed within the outer spherical housing as the drive system drives the at least two wheels rigidly contacting the inner surface to roll the outer spherical housing.

9. The method of claim 8, further comprising an orientation mechanism that keeps the drive system upwardly oriented within the outer spherical housing.

10. The method of claim 8, further comprising an orientation mechanism that keeps the vision system oriented with respect to gravity.

11. The method of claim 8, further comprising a separate inner sphere housed within the outer spherical housing, the inner sphere having two rolling contact points, a first rolling contact point of the two rolling contact points in rolling contact with a wheel of the at least three wheels, and a second rolling contact point of the two rolling contact points in rolling contact with the inner surface of the outer spherical housing.

12. The method of claim 11, further comprising housing the vision system within the inner sphere housed within the outer spherical housing.

13. The method of claim 8, further comprising an inner sphere that is concentric to the outer spherical housing.

14. The method of claim 13, further comprising housing the vision system within the inner sphere that is concentric to the outer spherical housing.

15. A self-propelled device, comprising:
    an outer spherical housing having an inner surface;
    a network interface housed within the outer spherical housing, the network interface providing an interface to a communications network;
    a drive system housed within the outer spherical housing, the drive system having at least one wheel engaging an inner orb internal to and separate from the inner surface of the outer spherical housing, the at least one wheel and the inner orb having a overall length equal to an inner diameter of the inner surface of the outer spherical housing such that the at least one wheel and the inner orb are each in rigid physical contact with the inner surface of the outer spherical housing, the at least one wheel capable of being driven by an electrical motor; and
    a vision system housed within the outer spherical housing, the vision system orienting a camera with respect to a gravity, the vision system generating a video data as the drive system rolls the inner surface to roll the self-propelled device.

16. The self-propelled device of claim 15, further comprising gimbals that orient the camera with respect to the gravity.

* * * * *